(12) United States Patent
Sabourin et al.

(10) Patent No.: US 11,987,282 B2
(45) Date of Patent: May 21, 2024

(54) DETECTION DEVICE FOR A VEHICLE STEERING WHEEL

(71) Applicant: Autoliv Development AB, Vargarda (SE)

(72) Inventors: Pierre Sabourin, Chapet (FR); Nathalie Potel-Charlette, Vaux sur Seine (FR); Laurent Groleau, Quincay (FR)

(73) Assignee: Autoliv Development AB, Vårgårda (SE)

( * ) Notice: Subject to any disclaimer, the term of this patent is extended or adjusted under 35 U.S.C. 154(b) by 203 days.

(21) Appl. No.: 17/310,198

(22) PCT Filed: Jan. 28, 2020

(86) PCT No.: PCT/EP2020/051981
§ 371 (c)(1),
(2) Date: Jul. 26, 2021

(87) PCT Pub. No.: WO2020/157032
PCT Pub. Date: Aug. 6, 2020

(65) Prior Publication Data
US 2022/0001910 A1    Jan. 6, 2022

(30) Foreign Application Priority Data
Jan. 31, 2019   (FR) ...................................... 1900956

(51) Int. Cl.
*B62D 1/04*     (2006.01)
*B60K 35/10*    (2024.01)
(Continued)

(52) U.S. Cl.
CPC .............. *B62D 1/046* (2013.01); *B60K 35/10* (2024.01); *B60R 21/01532* (2014.10);
(Continued)

(58) Field of Classification Search
CPC .......... B62D 1/06; B62D 1/046; B60K 37/06; G08B 21/06
See application file for complete search history.

(56) References Cited

U.S. PATENT DOCUMENTS 4,706,072 A     11/1987  Ikeyama
6,218,947 B1 *   4/2001  Sutherland ............. G08B 21/06
                                                 340/545.4
(Continued)

FOREIGN PATENT DOCUMENTS

DE           20309877 U1    10/2003
DE       102017110118 A1    11/2017
(Continued)

*Primary Examiner* — Thomas C Diaz
(74) *Attorney, Agent, or Firm* — Matthew D. Thayne; Thayne and Davis LLC

(57) ABSTRACT

Detection device for a steering wheel of a vehicle, said device being configured to detect contact or proximity of a person with or to the steering wheel, comprising sensors, of which there are only three, of which:
  a first sensor (21) is intended to be arranged on a left-hand half of a first face of the steering wheel,
  a second sensor (22) is intended to be arranged on a right-hand half of said first face of the steering wheel, and
  a third sensor (23) is intended to be arranged on a second face opposed to said first face of the steering wheel, and said first face is a rear face of the steering wheel.

15 Claims, 4 Drawing Sheets

(51) Int. Cl.
  *B60R 21/015* (2006.01)
  *B62D 1/06* (2006.01)
  *B60K 35/60* (2024.01)

(52) U.S. Cl.
  CPC ............... *B62D 1/06* (2013.01); *B60K 35/60* (2024.01); *B60K 2360/143* (2024.01); *B60K 2360/782* (2024.01)

(56) References Cited

U.S. PATENT DOCUMENTS

| | | | |
|---|---|---|---|
| 7,019,623 | B2 | 3/2006 | Klausner et al. |
| 8,095,270 | B2 * | 1/2012 | Bossler ............. B60R 21/01552 |
| | | | 701/41 |
| 8,841,929 | B2 * | 9/2014 | Bennett .................. B62D 1/046 |
| | | | 324/705 |
| 10,077,064 | B2 * | 9/2018 | Iguchi ...................... B62D 1/06 |
| 10,293,783 | B2 | 5/2019 | Frey et al. |
| 10,598,516 | B2 | 3/2020 | Matsumura |
| 10,889,254 | B2 * | 1/2021 | Odate .................... B62D 1/046 |
| 2004/0267422 | A1 | 12/2004 | Bossler et al. |
| 2009/0212974 | A1 | 8/2009 | Chiba et al. |
| 2012/0326735 | A1 * | 12/2012 | Bennett .................. B62D 1/06 |
| | | | 324/705 |
| 2014/0224040 | A1 * | 8/2014 | Van'tZelfde ............ B62D 1/046 |
| | | | 73/862.381 |
| 2015/0369633 | A1 | 12/2015 | Karasawa et al. |
| 2018/0087929 | A1 * | 3/2018 | Matsumura .............. G01D 5/24 |

FOREIGN PATENT DOCUMENTS

| | | |
|---|---|---|
| EP | 3103701 A1 | 12/2016 |
| GB | 2150725 A | 7/1985 |
| WO | 0194188 A1 | 12/2001 |
| WO | 2018/079096 A1 | 5/2018 |

\* cited by examiner

[Fig. 1]
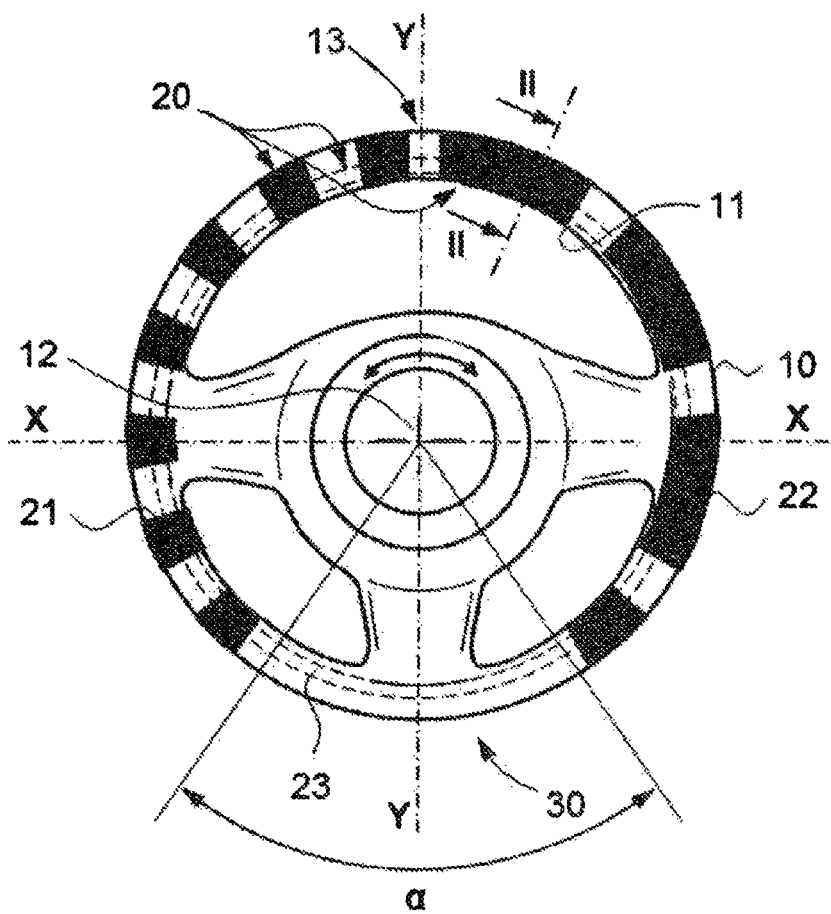
[Fig. 2]
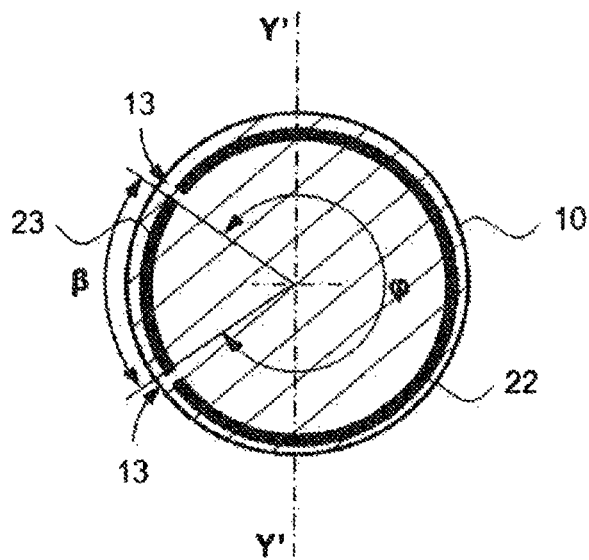

[Fig. 3A]
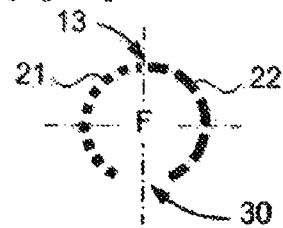
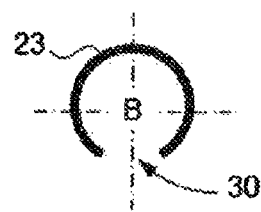
[Fig. 3B]
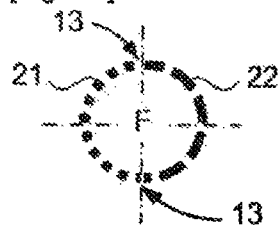
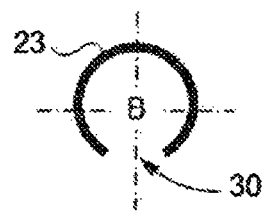
[Fig. 3C]
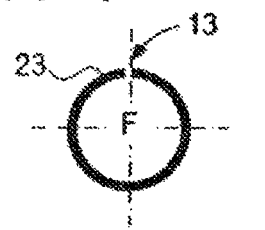
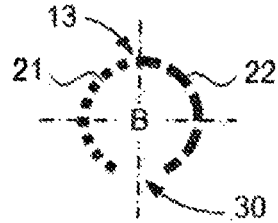

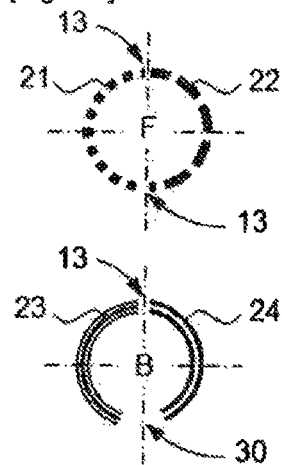
[Fig. 3D]
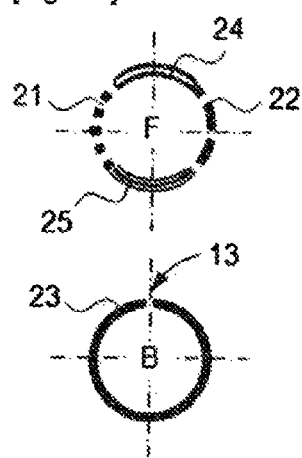
[Fig. 3E]
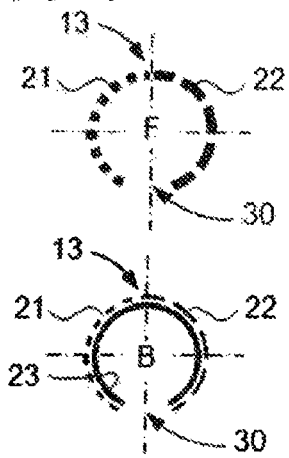
[Fig. 3F]

[Fig. 3G]
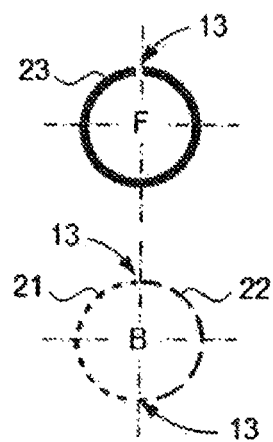
[Fig. 3H]
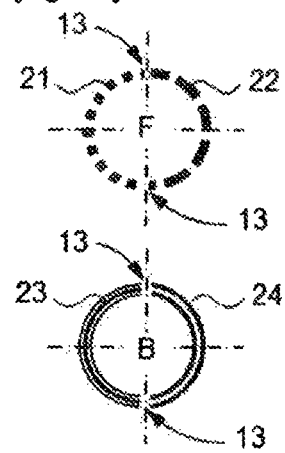
[Fig. 4]
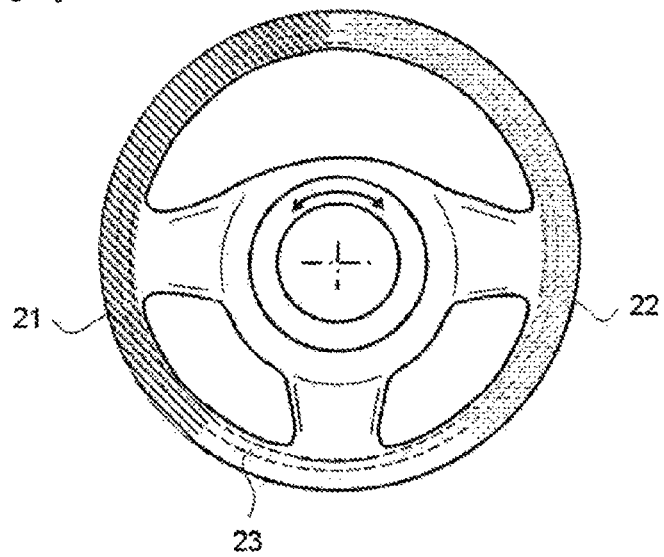

DETECTION DEVICE FOR A VEHICLE STEERING WHEEL

TECHNICAL FIELD

The present invention relates generally to the field of safety on board vehicles, and in particular the detection of a human presence in proximity to or in contact with a vehicle steering wheel, such as a motor vehicle for example. To that end, the present invention concerns several objects, particularly a detection device for a vehicle steering wheel, a steering wheel comprising such a device and a vehicle equipped with such a steering wheel. Each of these objects may have different aspects.

As regards safety, in particular active safety, numerous efforts are undertaken to make it possible to anticipate any potential danger in order to protect both the persons traveling outside the vehicle as well as those on board the vehicle. More and more, sensors are equipping vehicles for the better control of the exterior environment and to alert the driver, and even modify the dynamic behavior of the vehicle when a potential or actual danger arises.

In this field, progress is tending toward autonomous and semi-autonomous driving of vehicles during which the driver's attention may be relaxed to the point where he may release the steering wheel and divert his attention from the direction of driving. However, there are still some critical situations that cannot be managed by automated systems. Consequently, in these cases the driver needs to regain control of his vehicle and again seize his steering wheel. In order for the autonomous driving system to be able to detect that the driver has again taken over driving his vehicle by seizing his steering wheel, it is known to arrange sensor systems in the steering wheel of the vehicle.

However, the arrangement of driver sensory receptors or proximity sensors in the vehicle's steering wheel has still not proven to address the imperfections related to autonomous driving systems. Indeed, in any situation, the detection of a contact or a proximity of the driver relative to the steering wheel remains advantageous since it makes it possible to improve safety irrespective of the level of automation in the driving of the vehicle. Consequently, even in the presence of non-automated driving, it is of interest to equip vehicle steering wheels with such detection systems.

PRIOR ART

Document US 20040267422 introduces a safety system for the steering wheel of a vehicle wherein several sensors are arranged separate from one another, along the circumference of the steering wheel as well as around its radial section. In particular, this document discloses a steering wheel provided with three sensors on its front face. Thus, it becomes possible to detect in which sector(s) the driver is holding the steering wheel in order to deduce whether the driver is holding the steering wheel with one hand or both hands.

Document WO2018/079096 discloses another safety system for a vehicle steering wheel. This system is equipped with a sensor arranged so as to leave an inactive area on the edge located on the outermost part of the steering wheel, in the lower peripheral part thereof. In this way, only the lower peripheral part of the steering wheel remains inactive. Indeed, the inner edge of the steering wheel remains sensitive to the touch over the whole circumference of the steering wheel around its axis of rotation. This inactive area prevents the control system from determining that the holding of the steering wheel by the driver's lower limbs, such as his legs or knees, is an adequate holding of the steering wheel.

Document US 2015369633 describes the arrangement of electrostatic-capacitance sensors on a steering wheel so as to be able to detect whether or not one of the driver's hands is touching the steering wheel. To do this, the steering wheel is provided with one sensor on its left-hand part and another on its right part. These two sensors are arranged in such a way that the latter, located in the lower part of the steering wheel, is totally free of any sensor. This arrangement also makes it possible to consider the situation in which the driver would touch the lower part of the steering wheel with his lower limbs. Moreover, the sensors arranged on the steering wheel cover the entire radial section of the steering wheel.

The solutions known from the prior art may be perfected with respect to detection of the driver's hands on the steering wheel. Furthermore, they make it possible to satisfactorily differentiate the contact of a grip on the steering wheel, which may generate uncertainties in the decisions in response to the way in which the steering wheel is held by the driver. Finally, some solutions are relatively complex to carry out from the point of view of arrangement of the sensors on the steering wheel as well as their wiring, due to the number of sensors to be housed in the steering wheel. Such solutions resulted in significant production costs which affect the cost price and sale of vehicles.

Consequently, there is a benefit in finding a more adequate and effective solution that makes it possible, at least in part, to resolve the aforementioned disadvantages.

DISCLOSURE OF THE INVENTION

To that end, the present invention relates in a first aspect to a detection device, for a steering wheel of a vehicle, configured for detecting a contact or a proximity of a person with the steering wheel and comprising sensors, only three in number, among which:

a first sensor is intended to be arranged on a left-hand half of a first face of the steering wheel, a second sensor is intended to be arranged on a right-hand half of said first face of the steering wheel, and a third sensor is intended to be arranged on a second face opposed to said first face of the steering wheel, and in that said first face is a rear face of the steering wheel.

Typically, each sensor itself determines a sensitivity (or sensitization) area that is specifically sensitive to contact of a person such as the driver, particularly through a body part, clothed or not, of said driver. This area, which the sensor determines, may also be sensitive to the presence of a person in proximity to said sensor, therefore in proximity to the steering wheel. Preferably, the sensors used in the present invention are of the capacitive type and may be implanted beneath the outer surface of the rim of the steering wheel in order to detect a variation in capacitance occurring in particular when the driver approaches or touches the steering wheel. According to the present application, the rear face of the steering wheel is the one that faces or is turned towards the dashboard or windscreen, in contrast to a front face that faces or is oriented towards a driver in the driving position. Again according to the present invention, the left-hand half of the steering wheel is the one located on the right of the driver in driving position when the steering wheel is in a neutral position that allows the vehicle to move in a straight line.

The first aspect of the first object of the present invention, by positioning a single sensor, the third, on the front face of the steering wheel makes it possible to detect more reliably whether the driver is holding the left-hand and right parts of the steering wheel with one or both hands. In fact, in general the driver has multiple opportunities to place his hands in contact with the front face of the steering wheel without completely gripping it although when he has his hands in contact with the rear face, there is a better chance that the steering wheel is held firmly, i.e., with contact of the hand simultaneously with the front and rear of the steering wheel.

It is obvious that a detection device as described should function for the majority of drivers, namely at least from a 5th percentile to a 95th percentile of the population. Thus, detection systems are generally configured with triggering thresholds corresponding to a 5th percentile. Furthermore, the values measured by a capacitive sensor are proportional to the surfaces present. Thus, in the case where a 95th percentile places the palm of the left hand on the front face of the steering wheel and holds the right part of the steering wheel with the whole hand, the device will be capable of detecting that the steering wheel is not held by both hands because the left rear sensor will not detect anything. If the arrangement of the sensors were reversed, i.e., with two sensors on the front and a single one on the rear, the detection system could conclude that the steering wheel is held in both hands because the rear sensor will detect sufficient surface area for such conclusion since the measurement of one hand of a 95th percentile will be at least equivalent to the measurement of both hands of a 5th percentile.

In one embodiment, the first sensor is intended to cover at least 45% of a perimeter of the rim or at least 90° of an angular sector defined in a plane normal to an axis of rotation of the steering wheel and centered on the axis of rotation. In other words, the first sensor covers at least one fourth of a perimeter of the rim, front view.

In one embodiment, the second sensor is intended to cover at least 45% of a perimeter of the rim or at least 90° of an angular sector defined in a plane normal to an axis of rotation of the steering wheel and centered on the axis of rotation. In other words, the second sensor covers at least one fourth of a perimeter of the rim, front view.

In one embodiment, the third sensor is intended to cover at least 90% of a perimeter of the rim or at least 300° of an angular sector defined in a plane normal to an axis of rotation of the steering wheel and centered on the axis of rotation. In other words, the third sensor covers at least three fourths of a perimeter of the rim, front view.

It should be noted that the steering wheel according to this embodiment comprises only three detection sensors.

In one embodiment, the detection device may further be configured in such a way that each of the first and second sensors covers only one projecting angular sector of a radial cross-section of the steering wheel, said projecting angular sector preferably having a dimension or an included angle of less than 180°, preferably less than 120°, still more preferably less than 90°, even less than 60°, 45° or 30°. Again preferably, the third sensor of this device covers a flat or reentrant angular sector of said radial cross-section of the steering wheel. Such a reentrant angular sector may typically have a dimension or included angle of between 180° and 330° depending on the dimension or the included angle of the projecting angular sector covered by the first or second sensor. Thus by reducing the sensitivity area to the strict minimum, this makes it possible to detect with more certainty a proper grip of the steering wheel. Positioning the sensors only in the areas definitely involved in the hand positions where detection is desired improves the reliability of detection.

In a second aspect, the detection device, for a steering wheel of a vehicle, is configured to detect a contact or a proximity of a person with the steering wheel and comprises sensors among which:
  at least a first sensor is intended to be arranged on a first face, front, of the steering wheel, and
  at least a second sensor is intended to be arranged on a second face, rear, of the steering wheel, and to cover only a projecting angular sector of a radial cross-section of said steering wheel, and
in that said sensors are arranged in such a way that any radial cross-section of the steering wheel does not comprise more than two sensors and in that said second sensor covers, on said radial cross-section, an included angle that is less than or equal to 90% of an included angle of said first sensor.

According to one embodiment, the included angle of the second sensor may be less than 90°.

Advantageously, limiting the number of sensors present in any radial cross-section of the steering wheel makes it possible to simplify the arrangement of said sensors in the steering wheel, reducing the number of connections necessary for carrying the information obtained by said sensors and lowering the manufacturing cost of the detection device.

Again advantageously, reducing the sensitivity area conferred by certain sensors, in particular those intended to be arranged on the rear face of the steering wheel, makes it possible to detect with better certainty, or reliability, a correct grip of the steering wheel. Thus, the thinner said sensitivity area is or the more it is reduced to the strict minimum, the better the way in which the steering wheel is held or gripped will be able to be identified. Indeed, irrespective of the way in which the steering wheel is held, particularly fingers towards the interior or towards the exterior of the steering wheel, there is a reduced angular area that is always covered by the fingers, and particularly the intermediate phalanges or the palm of the hand.

As an alternative, the second sensor may have an included angle of less than or equal to 70%, even 50%, of the included angle of the first sensor.

In a preferred embodiment of this second aspect, the first sensor further covers only a projecting angular sector of the radial cross-section. Again preferably, the projecting angular sector, covered by the first and/or the second sensor, has a dimension or an included angle of 120°, preferably less than 90°, preferably less than 60°, preferably less than 45°, still preferably less than 30°.

In a third aspect, the detection device, for a steering wheel of a vehicle, is configured to detect a contact or proximity of a person with the steering wheel and comprising sensors, only three or four in number, among which:
  a first sensor is intended to be arranged on a left-hand half of a first face, front or rear, of the steering wheel,
  a second sensor is intended to be arranged on a right-hand half of said first face of the steering wheel, and
  at least a third sensor is intended to be arranged on a second face opposed to said first face of the steering wheel, and
in that the first and second sensors are configured to be arranged outside an inert area located in a lower half of said steering wheel on at least one of said first and second faces.

Advantageously, the configuration presented in the third aspect of this device makes it possible not only to desensitize the lower part of the steering wheel that may be held in ways other than by the driver's hands, by the knees for example, but also to determine if the driver is holding the steering wheel in by his hand(s) as well as to determine by which hand(s) the driver is holding the steering wheel.

In one particular embodiment, the inert area is further situated on a sector, pertaining to a plane of the steering wheel, that has an included angle of less than 120°, preferably between 10° and 45°, still more preferably between 15° and 30°.

Preferably, the inert area is further situated on a sector, pertaining to a plane of the steering wheel, which is centered on an axis delimiting the left-hand and right-hand halves of the steering wheel.

In one embodiment, the inert area is further located on at least one part of the rear face of the steering wheel.

According to a more particular embodiment, the inert area is partly limited by the interface of the front and rear faces of the steering wheel. The interface of the front and rear faces of the steering wheel is the demarcation or the junction between these two faces. This alternative makes it possible to optimize the detection the inert area is limited to a strict minimum thereof. Indeed, although the rear face of the steering wheel may be contacted by the knees or the thighs, it is more difficult to approach or touch the front face of the steering wheel with those members.

In another embodiment, said detection device may further be configured in such a way that each of the first and second sensors covers only a reentrant angular sector of a radial cross-section of the steering wheel, said reentrant angular sector having a dimension or an included angle of between 180° and 240°, and in that the third sensor covers only a projecting angular sector of said radial cross-section of the steering wheel, said projecting angular sector having a dimension or an included angle of less than 120°.

In a fourth aspect, the detection device, for a steering wheel of a vehicle, is configured to detect a contact or a proximity of a person with the steering wheel and comprises at least five sensors among which one sensor alone is intended to be arranged on a rear face of the steering wheel.

Advantageously, this aspect makes it possible to obtain a sufficiently fine grid making it possible to characterize more precisely the way in which the steering wheel is gripped by the driver while providing the steering wheel with a limited number of sensors. As a result, a solution is further obtained that is both simple and economical to produce.

Irrespective of the aspects or embodiments presented above, the device of the present invention may be broken down according to different alternatives.

In one alternative, the sensors could be configured to cover a flat angular sector of a radial cross-section of the steering wheel, since a flat angular sector has a dimension or an included angle equal to 180°.

In another alternative, the sensors together could have an axial symmetrical arrangement, particularly a symmetrical axis arrangement delimiting left-hand and right-hand halves of the steering wheel.

According to another alternative, at least one of said sensors has, on a radial cross-section of the steering wheel, a position and/or an included angle that varies depending on the location of said radial cross-section on the steering wheel. This makes it possible to better take into account different ways the driver can hold the steering wheel based on the location where said steering wheel is held, particularly holding the steering wheel in hand, especially fingers towards the interior or towards the exterior of the steering wheel at the bottom thereof.

According to another alternative, each sensor is protected by at least one overlayer formed from a material of the same nature throughout said layer. Preferably, at least a portion of said sensors have different detection thresholds that depend on the material of their overlayer.

Unless it is impossible, it should be noted that these alternatives may further be combined in any way.

The second object of the present invention relates in particular to a steering wheel comprising a device according to any one of the aspects and/or embodiments presented in the present description for this device, and where applicable, according to any one of the relative alternatives.

The third object of the present invention relates to a vehicle, in particular a motor vehicle, comprising a steering wheel such as the one presented as second object. In other words, this vehicle, preferably a motor vehicle, comprises a steering wheel and in particular a device such as the one presented as the first object of the present invention.

BRIEF DESCRIPTION OF THE FIGURES

Other features and advantages of the present invention will become more apparent upon reading the following detailed description which presents different aspects and embodiments of the invention, provided by way of entirely non-limiting examples and shown by the attached drawings, in which:

FIG. 1 schematically represents a steering wheel in a front view;

FIG. 2 schematically represents a partial radial cross-section of the steering wheel along the axis II-II of FIG. 1;

FIG. 3A is a schematic illustration, in a front view (from above) and in a back view (from below), of the detection device of the present invention according to a first embodiment;

FIG. 3B is a schematic illustration, similar to the one of FIG. 3A, of a second embodiment of the detection device;

FIG. 3C is a schematic illustration, similar to the one of FIG. 3A, of a third embodiment of the detection device;

FIG. 3D is a schematic illustration, similar to the one of FIG. 3A, of a fourth embodiment of the detection device;

FIG. 3E is a schematic illustration, similar to the one of FIG. 3A, of a fifth embodiment of the detection device;

FIG. 3F is a schematic illustration, similar to the one of FIG. 3A, of a sixth embodiment of the detection device;

FIG. 3G is a schematic illustration, similar to the one of FIG. 3A, of a seventh embodiment of the detection device;

FIG. 3H is a schematic illustration, similar to the one of FIG. 3A, of an eighth embodiment of the detection device;

FIG. 4 is a simplified view of the steering wheel of FIG. 1.

DETAILED DESCRIPTION

With reference to FIG. 1, this represents a steering wheel 10 of a vehicle, especially a motor vehicle and in particular the rear face of this steering wheel relative to the driver of the vehicle who, in a normal situation, is located facing the front face of the steering wheel. This steering wheel is typically a steering wheel for this vehicle. This steering wheel comprises a rim 11 intended to receive sensors 20, in particular detection sensors configured to detect a contact or a proximity of a person with the steering wheel. Typically, these sensors 20 are capacitive type sensors, implanted in the steering wheel 10, for example beneath or on the outer surface of the rim 11 of this steering wheel. By variation of capacitance, these sensors make it possible to detect if the conductor is touching the steering wheel or if a part of his body surface is in proximity to the steering wheel. It should be noted that the sensors 20 of the present invention are in no way limited to capacitive sensors, but could refer to sensors of a different type such as thermal sensors, pressure sensors or silicone sensors producing for example a piezo-electric or thermoelectric effect.

In the illustration of FIG. 1, three sensors 20 are shown schematically therein. Represented by a thick dashed line, the first sensor 21 is a sensor intended to be arranged on a left-hand half of a first rear face of the steering wheel 10. The second sensor 22 is represented by a thick broken line. This second sensor is a sensor intended to be arranged on a right-hand half of this first rear face of the steering wheel. The third sensor 23 is a sensor intended to be arranged on a second face opposed to the first face, namely on the front face of the steering wheel. For this reason, it is represented in this figure by a thin double dashed line.

In this figure, the left-hand and right-hand halves of the steering wheel are delimited by the vertical axis Y-Y and the upper and lower parts of the steering wheel are delimited by the horizontal axis X-X. The axes X-X and Y-Y are contained within the plane of the steering wheel. This plane of the steering wheel is a plane generally perpendicular to an axis of rotation of the steering wheel, the axis of rotation making it possible to steer the vehicle and passing through the middle of the rim. The axis Y-Y is a vertical axis when the steering wheel is in a neutral position, that is, when the vehicle can advance in a straight line. The axis X-X is perpendicular to the axis Y-Y. Furthermore, in this first figure it may be seen that only the third sensor 23 is a sensor that occupies all or nearly all the circumference of the steering wheel. The sensor covers nearly all the surface when it is necessary to provide areas of connection or of non-coverage from one edge to the other that prevents the sensor from being sensitive over the entire circumference. In other words, the sensor covers more than 95%, even more than 97% of the circumference of the steering wheel. In fact, the first and second sensors 21, 22 are configured to be arranged outside an inert area 30 of the steering wheel, located in the lower half of this steering wheel and preferably on the rear face thereof. This inert area 30 is located on one sector, in the present case a circular sector denoted a, which is part of the plane of the steering wheel. Thus, in this example the first and second sensors 21, 22 occupy only a circular sector in the plane of the steering wheel. It will also be noted that, irrespective of the embodiment, the sensors 20 are arranged in such a way that they are separated from one another by a distance or a gap 13, as shown for example in the upper part of FIG. 1. Between two contiguous sensors, this gap 13 is preferably as small as possible, although this is not always obvious in the appended schematic figures.

FIG. 4 represents the steering wheel of FIG. 1 in a simplified way, showing only the areas covered by the sensors 21, 22 and 23. To summarize, the first sensor 21 covers a rear area of the rim generally between 7 o'clock and noon, the second sensor covers a rear area of the rim generally between noon and 5 o'clock, and the third sensor 23 covers a front area of the rim over nearly 360°.

It should be specified that the gap 13 and the inert area 30 should not be confused. Indeed, the inert area 30 is much larger in size than the gap 13 because it must be able at least to cover the area of a portion of the driver's body on the steering wheel, such as hand(s), finger(s), knee(s), leg(s) or stomach, for example. This area 30 is inert because it is intentionally free of sensors 20 in order not to detect contact or proximity of a body part of the driver in at least one strategic location of the steering wheel. Such a location is typically in the lower half of the steering wheel and is deemed inappropriate for contact or proximity of the driver, particularly in the case where care should be taken for the appropriate control of the vehicle by means of this steering wheel. Typically, this makes it possible to consider that holding the steering wheel by means of one of the driver's lower limbs, such as a leg or knee, is equivalent to not holding the steering wheel. It should be noted that this inert area could also be defined as being a desensitized area, an inactive area or an area without sensors 20.

With reference to FIG. 2, this represents a radial cross-section of the steering wheel along the axis II-II of FIG. 1. This cross-section is called radial because it passes through a radius of the steering wheel 10, or in other words, through a plane passing through the center 12 of the steering wheel and perpendicular to the plane thereof. The illustration in FIG. 2 represents the front and rear faces of the steering wheel. In fact, the rear face is the one located to the right of the vertical axis Y'-Y' of FIG. 2, while the front face is at the left of this vertical axis.

The cross-section of FIG. 2 also introduces the ideas of projecting angular sector, reentrant angular sector and flat angular sector. It will be noted in this figure that the third sensor 23 located on the front face of the steering wheel occupies a projecting angular sector, denoted 13, while the second sensor 22 located on the rear face of the steering wheel occupies a reentrant angular sector denoted cp. Thus, a projecting angular sector has a dimension or an included angle of between 0° and 180°, while a reentrant angular sector has a dimension or an included angle of between 180° and 360°. Inserted between these two sectors is a flat angular sector, which then has a dimension or an included angle equal to 180°.

FIG. 2 therefore makes it possible to show that, in the embodiment used as example here, the third sensor 23 is much narrower than the second sensor 22, and that these two sensors 22, 23 cover all the circumference of the radial section of the steering wheel, except of course for the gaps 13 necessary for the proper operation of the sensors.

FIG. 3A to 3H are schematic illustrations of the detection device of the present invention. Each of these figures shows in a simplified way one particular embodiment in a front view F and in a back view B. These views are therefore respectively those that the driver would have (as opposed to the representation of FIG. 1), facing the steering wheel of his vehicle, when the steering wheel is positioned in such a way that the vehicle can move in a straight line.

In its first aspect, shown in FIGS. 3C and 3G, the first object of the present invention relates to a detection device, for a steering wheel of a vehicle, configured to detect a contact or proximity of a person with the steering wheel 10. This detection device comprises sensors 20, only three in number, among which:
  a first sensor 21 is intended to be arranged on a left-hand half of a first face of the steering wheel 10,
  a second sensor 22 is intended to be arranged on a right-hand half of the first face of the steering wheel 10, and
  a third sensor 23 is intended to be arranged on a second face opposed to said first face of the steering wheel.

According to the invention, the first face is the rear face of the steering wheel.

It will be noted that FIGS. 3C and 3G differ from one another by the fact that FIG. 3C comprises an inert area 30 while FIG. 3G does not have such area.

By configuring the first and second sensors in such a way that they are intended to be arranged on the left-hand and right-hand half of the rear face of the steering wheel, it becomes possible to improve the reliability of a correct grip of the steering wheel compared to a solution intending to arrange these first and second sensors on the front face of the steering wheel.

In an alternative as shown in FIGS. 3D and 3H, the detection device could comprise sensors, only four in number (instead of three), among which:
- a first sensor 21 would be intended to be arranged on a left-hand half of a first face of the steering wheel 10,
- a second sensor 22 would be intended to be arranged on a right-hand half of the first face of the steering wheel 10,
- a third sensor 23 and a fourth sensor 24 would be intended to be arranged on a second face opposed to said first face of the steering wheel.

As shown in FIGS. 3D and 3H, the first and second face are respectively front and rear faces of the steering wheel. However, since this alternative comprises exactly four sensors 20 and each one only occupies a front or rear half of the steering wheel, it is unimportant to know which of these sensors occupies the left-hand or right-hand half of the front or rear face of the steering wheel. In FIGS. 3D and 3H, the sensor 23 is represented by a heavy line framed by two thin lines while the sensor 24 is represented by two heavy lines, the white area in the middle of the two heavy lines being an inert area.

FIGS. 3D and 3H are differentiated from each other by the presence of an inert area 30 and therefore an absence of sensitivity in the lower half of the steering wheel on the rear face thereof.

FIG. 3G shows a particular embodiment of the device according to a first aspect (including its alternative), wherein each of the first and second sensors 21, 22 covers only a projecting angular sector of a radial cross-section of the steering wheel 10. It may be seen in FIG. 3G that the sensors 21, 22 are represented with a thinner line than the one that represents the third sensor 23 in this same figure. Preferably the aforementioned projecting angular sector has a dimension or an included angle of less than 120°.

According to another embodiment, the third sensor 23 could further cover a flat angular sector, namely equal to 180°, or a reentrant angular sector of the radial cross-section of the steering wheel. A reentrant angular sector could have a dimension or an included angle between 180° and 240°.

In a second aspect represented in particular by FIG. 3F, and also by FIG. 3G, the detection device, for a steering wheel 10 of a vehicle, is configured to detect a contact or proximity of a person with said steering wheel and it comprises sensors 20 among which:
- at least a first sector is intended to be arranged on a first face, front, of the steering wheel 10, and
- at least a second sensor is intended to be arranged on a second face, rear, of the steering wheel, and to cover only a projecting angular sector of a radial cross-section of the steering wheel.

Moreover, according to this second aspect the sensors 20 are arranged in such a way that any radial cross-section II-II of the steering wheel does not comprise more than two sensors and in that the second sensor covers, on any radial cross-section, a dimension or an included angle that is less than or equal to 90% of the dimension or of the included angle of the first sensor. The expression "any radial cross-section of the steering wheel" means that the location of the radial cross-section of the steering wheel is unimportant and therefore that the condition related to the maximum number of two sensors on the radial cross-section should be able to be verified irrespective of the placement of this cross-section on the steering wheel, i.e., irrespective of the location of the cross-section on the periphery of this steering wheel as viewed for example in FIG. 1.

According to FIG. 3F, the first sensor may be the sensor 21 or 22 of the front face of the steering wheel and the second sensor will correspond then to the sensor 23 on the rear face of this steering wheel. As shown in this FIG. 3F, the sensor 23 is represented with a thinner line representing the projecting angular sector that covers this sensor on a radial cross-section of the steering wheel. With reference to FIG. 3G, the first sensor will correspond to the sensor 23 arranged on the front face of the steering wheel while the second sensor will be the sensor 21 or 22 arranged on the rear face of this steering wheel. Indeed, it will be noted that each of these said sensors 21, 22 are also shown by a thinner line than the one that represents the sensor 23 located on the front face of the steering wheel, so as to represent a projecting angular sector on a radial cross-section of the steering wheel.

According to this second aspect, the steering wheel 10 may be provided with a plurality of sensors 20 without particular limitation as regards the number of sensors. However, any radial cross-section of this steering wheel will not have more than two sensors 20, that is, zero, one or two sensors. With reference to FIG. 3F, the particular case wherein the radial cross-section would not include any sensor could correspond to a cross-section made in the inert area 30 located in the lower half of the steering wheel. The particular case wherein a single sensor would be included in such radial cross-section could be obtained by extending the sensor 23 of FIG. 3F to cover the inert area 30 and by making a radial cross-section located at 6 o'clock. Thus, nothing precludes the fact that the steering wheel may still be provided with several sensors on its rear face and/or several sensors on its front face. Moreover, in this second aspect, the detection device still has the feature of defining a proportional relation between the first sensor (on the front face) and the second sensor (on the rear face), since the included angle of the second sensor on any radial cross-section of this steering wheel does not exceed 90% of the included angle of the first sensor on this same radial cross-section.

As an alternative, the second sensor may have, in any radial cross-section, an included angle of less than or equal to 70%, even 50%, of the included angle of the first sensor in this radial cross-section.

In a more precise alternative version of the second aspect, it will be mentioned that the object of the invention relates to a detection device, for a steering wheel 10 of a vehicle, configured to detect a contact or a proximity of a person with the steering wheel, comprising sensors 20, arranged on left-hand and right-hand halves of the steering wheel, among which:
- at least a first sensor is intended to be arranged on a first face, front, of the steering wheel, and
- at least a second sensor is intended to be arranged on a second face, rear, of the steering wheel, and to cover only a projecting angular sector of a radial cross-section of this steering wheel, and the sensors are arranged in such a way that any radial cross-section of the steering wheel does not comprise more than two sensors and in that the second sensor has, on the radial cross-section, an included angle that is less than or equal to 90% of an included angle of the first sensor.

In another embodiment of the second aspect, the first sensor, intended to be arranged on the front face of the steering wheel, covers only a projecting angular sector of the radial cross-section.

Irrespective of the embodiment of this second aspect, the projecting angular sector covered by the first and/or second sensor has a dimension or an included angle of less than 120°, 90°, 60°, 45° or 30°.

Advantageously, limiting the area of a sensor on the radial cross-section of the steering wheel makes it possible to increase the fineness of the sensitization area of the face of the steering wheel occupied by this sensor. The increase of this fineness in turn improves the determination of the way the steering wheel is held by the driver.

In a third aspect, the first object of the present invention relates to a detection device, for a vehicle steering wheel, configured to detect a contact or proximity of a person with the steering wheel 10. This detection device comprises sensors 20, only three or four in number, among which:

a first sensor 21 is intended to be arranged on a left-hand half of a first face, front or rear, of the steering wheel 10, a second sensor 22 is intended to be arranged on a right-hand half of said first face of the steering wheel 10, and at least a third sensor 23 is intended to be arranged on a second face opposed to said first face of the steering wheel.

According to the invention, the first and second sensors 21, 22 are configured to be arranged outside an inert area 30 located in a lower half of this steering wheel 10 on at least one of the first and second faces.

This aspect covers the different embodiments shown in FIGS. 3A, 3B, 3C, 3D and 3F. It will be noted that FIGS. 3A and 3B are differentiated from one another by the fact that the inert area 30 is located both on the front (F) and back (B) faces of the steering wheel in FIG. 3A, while it is located only in the back face (B) in FIG. 3B. Also, the embodiment illustrated in FIG. 3F is distinguished from the one in FIG. 3A by the fact that the third sensor 23 is narrower than the first and second sensors 21, 22. Other differences between the illustrations of these figures are pointed out in the other embodiments described in the present description. It should also be noted that the expression "at least a third sensor," mentioned above in the presentation of the object of the invention according to this third aspect, should be understood as referring to "a third sensor" or "a third and a fourth sensor" because the number of sensors does not exceed four in this third aspect.

The inert area 30 may further be situated on a sector pertaining to the plane of the steering wheel 10, such as the sector a shown in FIG. 1. Such a sector may have an included angle of less than 120°, preferably between 10° and 45°, more preferably between 15° and 30°. The value of the included angle of this sector corresponds to the dimension of said sector.

As is also clearly shown in FIG. 1, the inert area 30 is preferably located on a sector (of the plane of the steering wheel) that is centered on the Y-Y axis, i.e., on the axis that delimits the left-hand and right-hand halves of the steering wheel 10. It is specified that the axis Y-Y is located in a vertical plane when the steering wheel adopts a position in which the vehicle is directed straight ahead, that is, turning neither to the right nor to the left. The centering of the inert area 30 relative to this axis Y-Y derives from the fact that a priori there is no reason to think that a driver would be tempted for example to hold the steering wheel in this area more with the help of a left part of his body than with a right part thereof. It should also be noted that the vertical axis shown in FIG. 3A to 3H corresponds precisely with the above-mentioned axis Y-Y.

In one embodiment, the inert area 30 is further located on at least one part of the rear face of the steering wheel.

In a more specific embodiment, the inert area 30 is partly limited by the interface of the front and rear faces of the steering wheel. This means, for example, that not only the inert area 30 is located on the rear face of the steering wheel, but that in addition it extends to the limit between the front face and the rear face of the steering wheel, typically in the bottom part thereof.

In another embodiment shown in FIG. 3F or in FIGS. 1 and 2, the detection device may further be configured in such a way that each of the first and second sensors 21, 22 covers only a reentrant angular sector of a radial cross-section of the steering wheel. Typically, such a reentrant angular sector will be able to have a dimension or an included angle of between 180 and 240°. Furthermore, the third sector 23 preferably covers only a projecting angular sector of the radial cross-section of the steering wheel. Typically, such a projecting angular sector will be able to have a dimension or an included angle of less than 120°.

In a fourth aspect shown in FIG. 3E, the detection device, for a steering wheel 10 of a vehicle, is configured to detect a contact or a proximity of a person with the steering wheel and comprises at least five sensors 20 among which one sensor alone is intended to be arranged on the rear face of the steering wheel. In other words, the rear face (B) of the steering wheel 10 will comprise only one sensor, as shown in the example in said FIG. 3E.

Advantageously, this makes it possible to obtain a relatively fine grid of the system intended to determine the way in which the steering wheel 10 is gripped by the driver, while equipping the steering wheel with a limited number of sensors 20. In this way, a beneficial solution is provided that also has the advantage of being both simple and economical.

In a more specific alternative version of this fourth aspect, it will be mentioned that the object of the present invention relates to a detection device, for a steering wheel 10 of a vehicle, configured to detect a contact or a proximity of a person with said steering wheel and comprising at least five sensors 20, arranged on left-hand and right-hand halves of the steering wheel, among which only one sensor is intended to be arranged on the rear face of said steering wheel.

Irrespective of the four aspects and embodiments presented up to now, and subject to possible incompatibilities, it should be noted that the first object of the present invention may still be broken down into different alternatives, as described hereinafter.

In one alternative, the sensors could be configured to cover a flat angular sector of a radial cross-section of the steering wheel 10. Such an angular sector would therefore have a dimension equivalent to 180°. Typically, the front and rear sensors could then cover sectors going up to the interface between the front and rear faces of the steering wheel.

In another alternative, the sensors 20 together could have an axial symmetrical arrangement, particularly a symmetrical arrangement of axis Y-Y delimiting left-hand and right-hand halves of the steering wheel 10. In other words, in this alternative the sensors 20 would be arranged symmetrically with respect to the axis Y-Y of the steering wheel as shown in FIG. 1. It should be noted that FIG. 3A to 3H also have such axial symmetry (of axis Y-Y), although this is not necessarily a condition required for the embodiments represented in these figures.

According to another alternative, at least one of the sensors 20 has, on a radial cross-section of the steering wheel 10, a position and/or an included angle that varies depending on the location of said cross-section on the steering wheel. However, it is not necessary for all the possible radial cross-sections of the steering wheel to have a variation of the position and/or of the included angle of said sensor.

The variation of the position of the sensor in the plane of a radial cross-section of the steering wheel makes it possible, for example, to arrange said sensor in such a way that adopts a helical shape on this steering wheel. Thus, not only could such a sensor be located on one of the front or rear faces of the steering wheel, but in addition its orientation within said face could vary along the circumference of the steering wheel as shown for example in FIG. 1.

Advantageously, this feature makes it possible to take into account different ways in which the driver can hold the steering wheel, which ways may depend on the location where said steering wheel is held. For example, with reference to clock positions on the steering wheel as seen in FIG. 1, the driver can hold said wheel in a first way when his hands are positioned at 10 minutes till and 10 minutes past the hour, and hold said steering wheel in another way when his hands are positioned at quarter till and quarter past or 20 till and 20 past. In particular, this may be the case when considering the position of the thumbs of the hands when the hands hold the steering wheel at different locations. Typically, the thumbs will rather be directed towards the interior of the steering wheel when the hands are positioned on the top part of the upper half of the steering wheel, while they will also be directed toward the exterior of the steering wheel in the lower half thereof. The effect of imposing an angular rotation of the sensor along the steering wheel, at least along one part of these circumference thereof (circumference as shown in FIG. 1), advantageously makes it possible to take advantage of various subtleties in the holding of the steering wheel by the driver.

Such subtleties may also be taken into account by varying the included angle of said sensor along the circumference or a portion thereof. For example, and with reference to the radial cross-section of FIG. 2, it could be that the included angle β of the third sensor 23 is not constant all along the circumference of the steering wheel (circumference as shown in FIG. 1), but could vary along said circumference or as a function of the specific locations thereupon. Moreover, it should be noted that these variations, whether they involve the position or included angle of the sensor on the radial cross-section, need not necessarily be regular or progressive.

In another alternative, each sensor 20 is protected by at least one overlayer formed from a material of the same nature throughout said layer. Indeed, and as explained with reference to FIG. 1, the sensors are typically intended to be arranged on the rim 11 of the steering wheel 10. Thus, they are generally not located directly on the surface of the steering wheel but are generally placed inside the steering wheel, beneath an overlayer that typically may be the one in direct contact with the driver's hands. Such a layer may be formed from a material such as plastic, leather or wood for example. According to the present alternative, each sensor is covered by such a layer of material and said material is only formed from material of the same nature. Thus, the same sensor will not be covered by an overlayer of leather for example on a first portion, then of wood on another portion. In this way, it is possible to take into account the impact of the overlayer on the dimension and thus to impose different detection thresholds on the sensors 20 based on the layer that covers them.

For this reason, one alternative could consist in providing at least one portion of the sensors 20 with different detection thresholds that depend on the material of their overlayer. Thus, at least one portion of the sensors could further be configured to have detection thresholds that are increased or reduced based on the material of their overlayer. In this way, and from a set of identical sensors, it could become possible for example to balance the apparent sensitivity of all of said sensors, in spite of the fact that they are all not arranged beneath materials of the same electrical conductivity and therefore cannot render the same capacitive effect.

It should also be noted that several times the present description refers to a person in the different embodiments of the first object presented in this description. This person typically refers to the driver of the vehicle, although another person, such as the front passenger of the motor vehicle for example, could be substituted for this driver.

The second object of the present invention concerns the steering wheel comprising a device according to any one of the aspects presented in the present description for this device, and where applicable, according to any one of the relative alternatives. Thus, this second object relates to a steering wheel of the vehicle, particularly a steering wheel of a motor vehicle comprising a detection device according to any one of the aspects, alternatives or embodiments to which reference is made in this description. It should also be noted that the steering wheel 10 typically refers to a steering wheel of a vehicle.

The third object of the present invention relates to a vehicle, in particular a motor vehicle, comprising a steering wheel such as the one presented as second object. In other words, this vehicle, preferably a motor vehicle, comprises a steering wheel and in particular a device such as the one presented as the first object of the invention.

Although the objects of the present invention have been described with reference to specific examples, various modifications and/or obvious improvements could be contributed to the embodiments described without departing from the spirit and scope of the invention.

The invention claimed is:

1. A steering wheel of a vehicle, configured with a detection device to detect contact or proximity of a person with the steering wheel, the detection device comprising only three sensors, among which:
   a first sensor arranged on a left-hand half of a first face of the steering wheel and to cover at least 45% of a perimeter of the rim or at least 90° of an angular sector defined in a plane normal to an axis of rotation of the steering wheel and centered on the axis of rotation,
   a second sensor arranged on a right-hand half of said first face of the steering wheel and to cover at least 45% of a perimeter of the rim or at least 90° of an angular sector defined in the plane normal to an axis of rotation of the steering wheel and centered on the axis of rotation, and
   a third sensor arranged on a second face opposed to said first face of the steering wheel and to cover at least 90% of a perimeter of the rim or at least 300° of an angular sector defined in the plane normal to an axis of rotation of the steering wheel and centered on the axis of rotation,
   wherein said first face is a rear face of the steering wheel, and
   wherein at least one of said sensors has, on a radial cross-section of the steering wheel, a position and/or an included angle that varies depending on a location of said radial cross-section on the steering wheel.

2. The steering wheel according to claim 1, wherein said sensors together have an axial symmetric arrangement of axis delimiting left and right halves of the steering wheel.

3. The steering wheel according to claim 1, wherein each sensor is protected by at least one overlayer formed from a material of the same nature throughout said layer.

4. The steering wheel according to claim 1 in combination with a vehicle steering wheel.

5. The steering wheel according to claim 1 in combination with a motor vehicle.

6. The steering wheel according to claim 1, wherein the third sensor covers more than 95% of the circumference of the steering wheel.

7. The steering wheel according to claim 6, wherein the third sensor occupies at least substantially all of the circumference of the steering wheel.

8. The steering wheel according to claim 7, wherein the third sensor occupies all of the circumference of the steering wheel.

9. A steering wheel of a vehicle, configured with a detection device to detect a contact or proximity of a person with the steering wheel, the detection device comprising sensors, among which:
   at least a first sensor arranged on a first front face of the steering wheel, and
   at least a second sensor arranged on a second rear face of the steering wheel and to cover only a projecting angular sector of a radial cross-section of said steering wheel,
   wherein said sensors are arranged in such a way that any radial cross-section of the steering wheel does not comprise more than two sensors and in that said second sensor covers, on said radial cross-section, an included angle of less than 90° and which is less than or equal to 90% of an included angle of said first sensor.

10. The steering wheel according to claim 9, wherein the first sensor further covers only a projecting angular sector of said radial cross-section.

11. The steering wheel according to claim 9, wherein said projecting angular sector of the second sensor, has an included angle of less than 120°.

12. The steering wheel according to claim 9, wherein said projecting angular sector has an included angle of less than 90°.

13. The steering wheel according to claim 12, wherein said projecting angular sector has an included angle of less than 60°.

14. The steering wheel according to claim 13, wherein said projecting angular sector has an included angle of less than 45°.

15. The steering wheel according to claim 14, wherein said projecting angular sector has an included angle of less than 30°.

* * * * *